United States Patent
Pan

(10) Patent No.: US 7,197,421 B2
(45) Date of Patent: Mar. 27, 2007

(54) METHOD AND SYSTEM FOR A TEMPERATURE SENSOR FOR TRANSMITTER OUTPUT POWER COMPENSATION

(75) Inventor: Michael (Meng-An) Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/001,438

(22) Filed: Nov. 30, 2004

(65) Prior Publication Data

US 2006/0116845 A1    Jun. 1, 2006

(51) Int. Cl.
   *G01K 7/16* (2006.01)
(52) U.S. Cl. .............. 702/133; 702/130; 374/178; 377/25
(58) Field of Classification Search .............. 702/133
   See application file for complete search history.

(56) References Cited

U.S. PATENT DOCUMENTS

| | | | | |
|---|---|---|---|---|
| 4,122,719 A | * | 10/1978 | Carlson et al. | 374/167 |
| 4,672,842 A | * | 6/1987 | Hasselmann | 73/49.2 |
| 5,295,746 A | * | 3/1994 | Friauf et al. | 374/170 |
| 5,669,713 A | * | 9/1997 | Schwartz et al. | 374/1 |
| 5,961,215 A | * | 10/1999 | Lee et al. | 374/178 |
| 6,115,441 A | * | 9/2000 | Douglass et al. | 377/25 |
| 6,249,753 B1 | * | 6/2001 | Mason et al. | 702/104 |
| 6,280,081 B1 | * | 8/2001 | Blau et al. | 374/1 |
| 6,356,191 B1 | * | 3/2002 | Kirkpatrick et al. | 340/501 |
| 6,567,763 B1 | * | 5/2003 | Javanifard et al. | 702/130 |
| 6,775,638 B2 | * | 8/2004 | Gauthier et al. | 702/130 |

* cited by examiner

*Primary Examiner*—John Barlow
*Assistant Examiner*—Jonathan Moffat
(74) *Attorney, Agent, or Firm*—McAndrews, Held & Malloy, Ltd.

(57) ABSTRACT

In an RF communication system, aspects of a method for a temperature sensor for transmitter output power compensation may comprise generating an output voltage, which may vary with temperature, from at least one reference voltage, wherein at least one reference voltage may vary proportionally with temperature. The output voltage may be converted to a digital value. The reference voltage may be generated by utilizing a current source to generate a voltage across a resistive load. A control voltage generated from an operational amplifier may control at least one current source. PN junction characteristics of at least one bipolar junction transistor may be utilized to generate an input reference voltage for the operational amplifier. Resistance of at least one resistor, which may be coupled to the bipolar junction transistor and to the operational amplifier, may be adjusted to determine a current level from the current source at a plurality of different temperatures.

46 Claims, 8 Drawing Sheets

METHOD AND SYSTEM FOR A TEMPERATURE SENSOR FOR TRANSMITTER OUTPUT POWER COMPENSATION

CROSS-REFERENCE TO RELATED APPLICATIONS/INCORPORATION BY REFERENCE

This application makes reference to:
U.S. patent application Ser. No. 11/000599 filed Nov. 30, 2004; and
U.S. patent application Ser. No. 11/000622 filed Nov. 30, 2004.

The above stated applications are being incorporated herein by reference in their entirety.

FIELD OF THE INVENTION

Certain embodiments of the invention relate to control of power with temperature changes on integrated circuits or chips. More specifically, certain embodiments of the invention relate to a method and system for a temperature sensor for transmitter output power compensation.

BACKGROUND OF THE INVENTION

In some conventional systems, a transmitter may broadcast radio frequency (RF) signals. Generally, RF signals are generated by upconverting baseband signals to intermediate frequency (IF) signals, and then further upconverting the IF signals to RF signals. The RF signals may be amplified by power amplifiers before being transmitted by a transmit antenna. Due to the proliferation of wireless devices such as telephones, walkie-talkies, personal digital assistants (PDAs), and routers in home computer networks, a strong transmitted signal with a particular operating frequency band may cause interference for wireless devices operating within the same frequency band or other neighboring frequency bands.

Frequency reuse may be utilized to minimize the impact of interference between neighboring frequency bands. With frequency re-use, multiple transmitters may be assigned to utilize the same frequency, as long as the transmitters are far enough away from each other that their transmitted signals do not interfere with each other. The most common example of frequency re-use today may be cellular communication networks utilizing time-domain multiple access (TDMA) standard. In this regard, the same frequency is utilized in cells that are not in close proximity with each other so as to minimize the effects of interference. The network operators take much care in ensuring that various frequency bandwidths are spread out among the plurality of cells such that transmitted signal in one cell does not overpower other transmitted signals of the same frequency in other cells. Other frequency re-use examples are radio stations and television stations. The Federal Communications Commission (FCC) strictly regulates the broadcasting frequencies of the radio and television stations in order to keep neighboring stations from interfering with each other. The FCC also regulates the power output of the transmitting stations in order to keep distant stations from interfering with local stations that may be broadcasting at the same frequency.

In other instances, all transmitters may transmit in the same frequency bandwidth, but, still, care must be taken to ensure that no "rogue" transmitter transmits at too high power to "drown out" other transmitted signals. Code division multiple access (CDMA) system is an example where all transmitters transmit over the same frequency bandwidth. In CDMA, special algorithms are used to code and/or decode a specific signal of interest to a transmitter and/or a receiver. Although all receivers may receive the transmitted signals, when a receiver's specific decoding code is utilized by a receiver, all other signals except the desired signal appears as random noise. However, if a transmitter transmits too much power, then that signal would appear as too much noise to other receivers, and the desired signals at other receivers may be drowned out by the noise. Therefore, a transmitted signal must be transmitted with enough power to be able to be received and decoded by a receiver, and yet must not have too much power that it interferes with other signals.

Generally, controlling output power of a transmitter is extremely important to minimize interference with other transmitted signals while still providing enough transmitted signal strength to be able to be received and processed by a receiver. In addition, a transmitter of limited power source, for example, mobile communication handset with a small battery, may need to accurately control power output in order to maximize battery life. However, a problem is that performance of various electronic devices, for example, resistors or semiconductor devices on integrated circuits may be affected by temperature. As temperature rises, a resistor's resistance may increase, thereby affecting current and voltage, and vice versa as temperature decreases. Similarly, the current that a transistor on a chip may conduct may vary as temperature changes. The change in voltage and/or current may affect the transmitter output power.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a temperature sensor for transmitter output power compensation. Aspects of the method may comprise generating at least one reference voltage, which may vary proportionally with temperature. An output voltage proportional to temperature may be generated by utilizing at least one reference voltage, and the generated output voltage may be converted to a digital value.

The method may further comprise generating the reference voltage utilizing at least one current source to generate a voltage across a resistive load. A control voltage generated from an operational amplifier may be fed back to at least one current source, and utilized to control the current source. Input reference voltage may be generated for the operational amplifier by utilizing PN junction characteristics of at least one bipolar junction transistor. A resistance of at least one resistor, which may be coupled to the bipolar junction transistor and to the operational amplifier, may be adjusted to determine a current level from the current source at a plurality of different temperatures.

The determined current level may substantially be constant over the plurality of different temperatures. The current source may be utilized to generate the reference voltage by generating a substantially constant voltage across a resistive load. The determined current level of the current generated by the current source may also vary with the plurality of different temperatures. The current source may be utilized to generate the reference voltage, which varies with temperature, by generating a voltage across a resistive load, wherein that generated voltage varies with temperature.

The reference voltage that varies proportionally with temperature may be converted to a digital value, and a reference voltage variation with temperature may be determined. A lookup table be generated based on the determination of the reference voltage variation. The lookup table may comprise a plurality of temperatures, each of which may be mapped to a particular one of a plurality of corresponding digital values.

The output voltage may be generated utilizing at least one operational amplifier and the output voltage may be fed back to an input of the operational amplifier. The output voltage may be a difference of the reference voltage that varies proportionally with temperature and at least one of the reference voltages that does not vary with temperature. The variation of the output voltage with temperature may be determined, and a lookup table based on the determination of the output voltage variation may be generated. The lookup table may comprise a plurality of temperatures, each of which may be mapped to a particular one of a plurality of corresponding digital values.

Aspects of the system may comprise circuitry that generates at least one reference voltage, which may vary proportionally with temperature. The system may comprise circuitry that utilizes at least one reference voltage to generate an output voltage that may be proportional to temperature. At least one analog-to-digital converter may be utilized to convert the generated output voltage to a digital value. At least one current source may be utilized to generate a voltage across a resistive load to generate the reference voltage.

The system may further comprise an operational amplifier that generates a control voltage that is fed back to control at least one current source, and at least one bipolar junction transistor. PN junction characteristics of at least one bipolar junction transistor may be used to generate input reference voltage for the operational amplifier. The system may also comprise at least one resistor, which may be coupled to the bipolar junction transistor and to the operational amplifier. The resistance of the resistor may be adjusted to determine a current level from the current source at a plurality of different temperatures. The determined current level generated by the current source may be substantially constant over the plurality of different temperatures. The current source may be configured to generate substantially constant voltage across the resistive load to generate the reference voltage. The determined current level may also vary with the plurality of different temperatures. The system may further comprise a resistive load, across which a voltage, which may vary with temperature, may be generated by the current source. The voltage across the resistive load may be the reference voltage that varies with temperature. The analog-to-digital converter may be utilized to convert the reference voltage that varies proportionally with temperature to a digital value.

A variation of the reference voltage with temperature may also be determined, and a lookup table may be generated, which is based on the determination of the reference voltage variation. The lookup table may comprise a plurality of temperatures, each of which may be mapped to a particular one of a plurality of corresponding digital values. The system may comprise at least one operational amplifier that may be adapted to generate the output voltage, which may be fed back to an input of the operational amplifier. The output voltage may be a difference of the reference voltage that varies proportionally with temperature and at least one of the reference voltages that does not vary with temperature. The system may further comprise a lookup table, which may be generated based on a determination of the output voltage variation may be generated. The lookup table may comprise a plurality of temperatures, each of which may be mapped to a particular one of a plurality of corresponding digital values.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a temperature sensor for transmitter output power compensation. Various aspects of the invention may be utilized in, for example, a mobile communication handset, which may be adapted to transmit RF signals. Transmit power specifications for the handset may have a very narrow range, for example, 3 decibels-milliwatt (dBm), plus or minus 2 decibels (dBs), and operating temperature variation for the handset may cause the transmit power to drift out of the specified power range. An embodiment of the invention may provide temperature sensing in order to be able to determine and provide appropriate compensation to a transmitter so as to mitigate the effects of power fluctuations due to temperature variations.

Figure 1B:
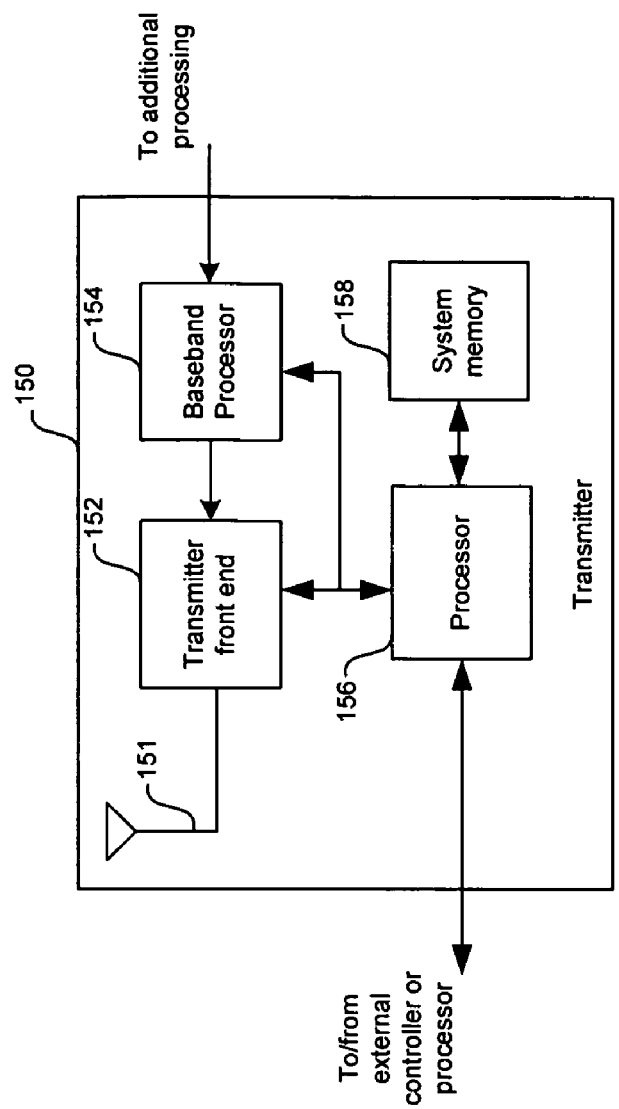
FIG. 1b is a block diagram of the exemplary transmitter system of FIG. 1a, for example, that may be utilized in connection with an embodiment of the invention.
Figure 1A:
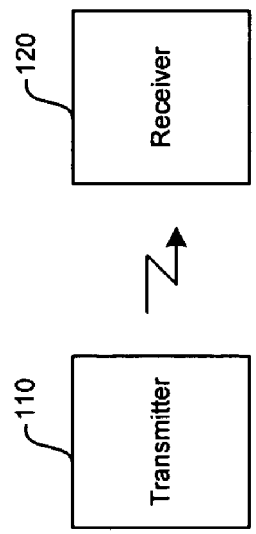
FIG. 1a is a block diagram of an exemplary transmitter system and receiver system that may be utilized in connection with an embodiment of the invention.

FIG. 1a is a block diagram of an exemplary transmitter system and receiver system that may be utilized in connection with an embodiment of the invention. Referring to FIG. 1a, there is shown a transmitter block 110 and a receiver block 120. The transmitter block 110 may comprise suitable logic, circuitry, and/or code that may be adapted to filter, modulate, and amplify a baseband signal to an RF signal, and transmit the RF signal. The receiver block 120 may comprise suitable logic, circuitry, and/or code that may be adapted to receive the RF signal and to demodulate the RF signal to the baseband signal.

In operation, the transmitter block 110 may be adapted to transmit RF signals over a wired or wireless medium. The receiver block 120 may be adapted to receive the RF signals and process it to a baseband signal that may be suitable for further processing, for example, as data or voice.

FIG. 1b is a block diagram of the exemplary transmitter system of FIG. 1a, for example, that may be utilized in connection with an embodiment of the invention. Referring to FIG. 1b, the RF transmitter system 150 may comprise a transmitting antenna 151, a transmitter front end 152, a baseband processor 154, a processor 156, and a system memory 158. The transmitter front end (TFE) 152 may comprise suitable logic, circuitry, and/or code that may be adapted to upconvert a baseband signal to an RF signal and to transmit the RF signal via a transmitting antenna 151. The TFE 152 may be adapted to execute other functions, for example, filtering the baseband signal, and/or amplifying the baseband signal.

The baseband processor 154 may comprise suitable logic, circuitry, and/or code that may be adapted to process baseband signals, for example, convert a digital signal to an analog signal, and/or vice versa. The processor 156 may comprise suitable logic, circuitry, and/or code that may be adapted to control the operations of the TFE 152 and/or the baseband processor 154. For example, the processor 156 may be utilized to update and/or modify programmable parameters and/or values in a plurality of components, devices, and/or processing elements in the TFE 152 and/or the baseband processor 154. Control and/or data information, which may include the programmable parameters, may be transferred from at least one controller and/or processor, which may be external to the RF transmitter system 150, to the processor 156. Similarly, the processor 156 may be adapted to transfer control and/or data information, which may include the programmable parameters, to at least one controller and/or processor, which may be externally coupled to the RF transmitter block 110.

The processor 156 may utilize the received control and/or data information, which may comprise the programmable parameters, to determine an operating mode of the TFE 152. For example, the processor 156 may be utilized to select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. The information stored in system memory 158 may be transferred to the TFE 152 from the system memory 158 via the processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2:
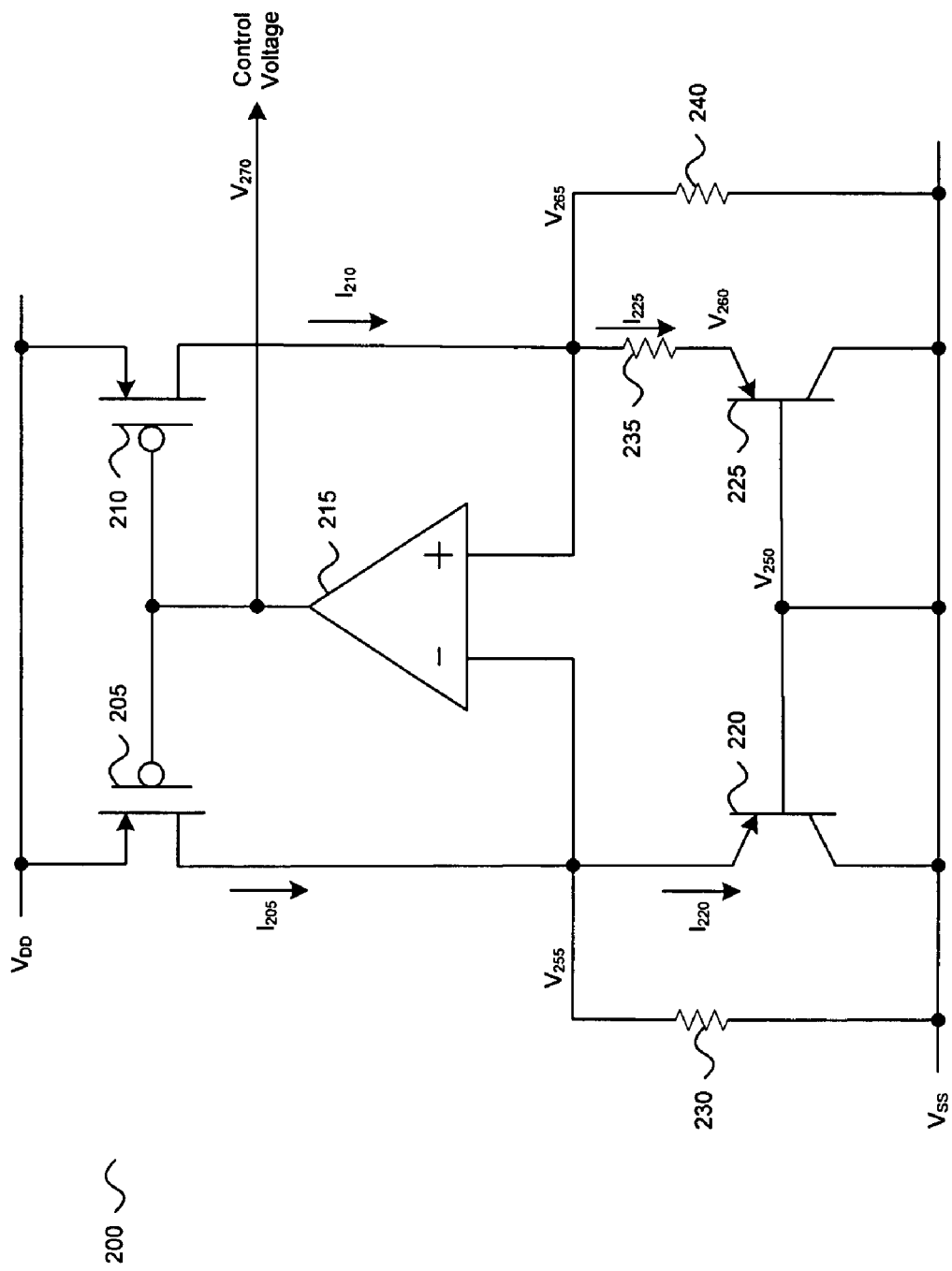
FIG. 2 is a block diagram illustrating exemplary current source controller, in accordance with an embodiment of the invention.

FIG. 2 is a block diagram illustrating an exemplary current source controller, in accordance with an embodiment of the invention. Referring to FIG. 2, there is shown a current source controller 200 that comprises PMOS transistors 205 and 210, an operational amplifier (op amp) 215, PNP junction transistors 220 and 225, and resistors 230, 235 and 240. Additionally, there is shown a plurality of voltages $V_{250}$, $V_{255}$, $V_{260}$, $V_{265}$ and $V_{270}$.

A higher voltage potential $V_{DD}$ provided by a voltage supply may be communicated to a source of each of the PMOS transistors 205 and 210. A gate of each of the PMOS transistors 205 and 210 may be coupled to an output of the op amp 215. A drain of the PMOS transistor 205 may be coupled to a first terminal of the resistor 230, to an emitter of the PNP transistor 220, and to a negative input of the op amp 215. A drain of the PMOS transistor 210 may be coupled to a first terminal of each of the resistors 235 and 240, and to a positive input of the op amp 215. A second terminal of the resistor 235 may be coupled to an emitter of the PNP transistor 225. A lower voltage potential $V_{SS}$ of the voltage supply may be communicated to each second terminal of the resistors 230 and 240, to a collector of each of the PNP transistors 220 and 225, and to a base of each of the PNP transistors 220 and 225.

In operation, a control voltage $V_{270}$ of the op amp 215 may be communicated to the gates of the PMOS transistors 205 and 210, and the PMOS transistors 205 and 210 may be adapted to function as current sources sourcing currents $I_{205}$ and $I_{210}$, respectively, in which $I_{205}$ may be the same amount of current as $I_{210}$. At equilibrium, if a resistance of the resistor 230 ($R_{230}$) is the same as a resistance of the resistor 240 ($R_{240}$), the voltage $V_{255}$ at the negative input of the op amp 215 may be the same as the voltage $V_{265}$ at the positive input of the op amp 215, and a current $I_{220}$ through PNP transistor 220 may be the same as a current $I_{225}$ through the PNP transistor 225. Therefore, the current through the resistor 230 ($I_{R230}$) may be $$I_{R230}=V_{255}/R_{230},$$

which may be equal to the current $I_{R240}$ through the resistor 240

$$I_{R240}=V_{265}/R_{240}$$

Furthermore, a PNP transistor may have a collector current $I_c$ that is defined by $$I_c=I_s*exp(V_{be}/V_t)$$

where $I_s$ is a constant that is dependent on transistor geometry and $V_{be}$ is the base emitter voltage. Furthermore, $V_t$ is defined by $$V_t=KT/q$$

where K is Boltzmann's constant, $1.38\times10^{-23}$ Joules/Kelvin, T is temperature in Kelvin scale, and q is a charge of an electron, $1.6\times10^{-19}$ Coulombs. $V_{be}$ may then be defined by $$V_{be}=V_t*ln(I_c/I_s).$$

Therefore, if $V_{be1}$ is the base emitter voltage for the PNP transistor 220, $V_{be2}$ is the base emitter voltage for the PNP transistor 225, $I_{c1}$ is the current through the PNP transistor 220, $I_{c2}$ is the current through the PNP transistor 225, $I_{s1}$ is the constant for the PNP transistor 220, and $I_{s2}$ is the constant for the PNP transistor 225, then $$V_{be1}=V_t*ln(I_{c1}/I_{s1})$$

and $$V_{be2} = V_t * \ln(I_{c2}/I_{s2}).$$

Since $I_{c1}$ may be the same as $I_{c2}$, $$\begin{aligned}
V_{be1} - V_{be2} &= V_t * \ln(I_{c1}/I_{s1}) - V_t * \ln(I_{c2}/I_{s2})\\
&= V_t * \ln((I_{c1}/I_{s1}) * (I_{s2}/I_{c2}))\\
&= V_t * \ln(I_{s2}/I_{s1}).
\end{aligned}$$

If the PNP transistor 225 is, for example, four times the size of the PNP transistor 220, then the equation reduces to:

$$\begin{aligned}
V_{be1} - V_{be2} &= V_t * \ln(4)\\
&= (KT/q) * \ln(4).
\end{aligned}$$

This voltage may be directly proportional to temperature and may be referred to as a proportional to absolute temperature (PTAT) voltage ($V_{PTAT}$). The $V_{PTAT}$ may also be a voltage across the resistor 235, which may have a resistance of $R_{235}$.

Additionally, the following equations may also describe the current $I_{205}$ from the PMOS transistor 205, which may be equal to the current $I_{210}$ from the PMOS transistor 210:

$$\begin{aligned}
I_{205} &= I_{R230} + I_{c1} = I_{210} = I_{R240} + I_{c2}\\
&= I_{R230} + I_{c2}\\
&= (V_{be1}/R_{230}) + (V_{be1} - V_{be2})/R_{235}\\
&= (1/R_{230})(V_{be1} + ((V_{be1} - V_{be2})/(R_{235}/R_{230})))\\
&= (1/R_{230})(V_{be1} + (V_{PTAT}/(R_{235}/R_{230})))\\
&= (1/R_{230})(V_{be1} + (V_{PTAT} * (R_{230}/R_{235})))
\end{aligned}$$

Since $V_{be1}$ and $V_{PTAT}$ both vary with temperature, if one varies inversely with temperature while the other varies directly with temperature, then by choosing correct values for $R_{230}$ and $R_{235}$, the current $I_{205}$, which may be equal to $I_{210}$, may be a substantially constant current regardless of temperature. It may also be noted that choosing other values for $R_{230}$ and $R_{235}$ may result in a current that may vary with temperature. In that case, the currents $I_{205}$ and $I_{210}$ may be PTAT, and the proportionality with temperature may have different slopes depending on the resistances $R_{230}$ and $R_{235}$. Each of the resistors 230, 235 and 240, may be a plurality of parallel resistors, and the resistance of each resistor 230, 235 and 240 may be adjusted by allowing current to flow through one or more of the plurality of parallel resistors. In that regard, each of the resistors 230, 235 and 240 may be under programmed control of a processor, for example, the processor 156 (FIG. 1b). The processor may communicate a value which may indicate which of the plurality of parallel resistors may conduct current.

Figure 3B:
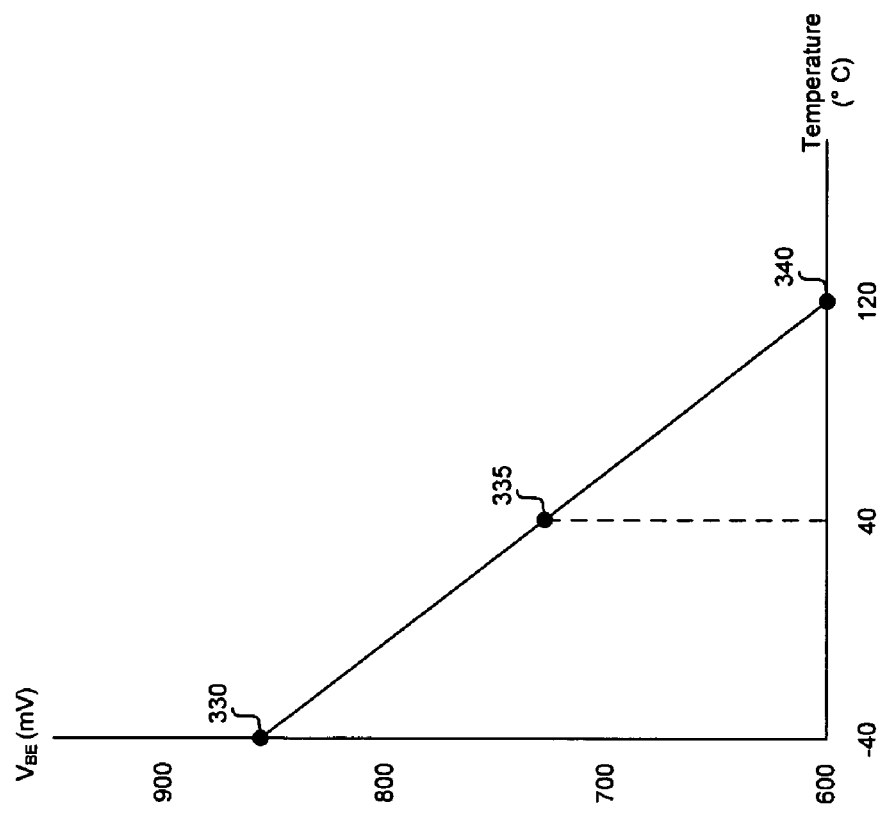
FIG. 3b is an exemplary graph of base-emitter voltage ($V_{BE}$) versus temperature, in accordance with an embodiment of the invention.
Figure 3A:
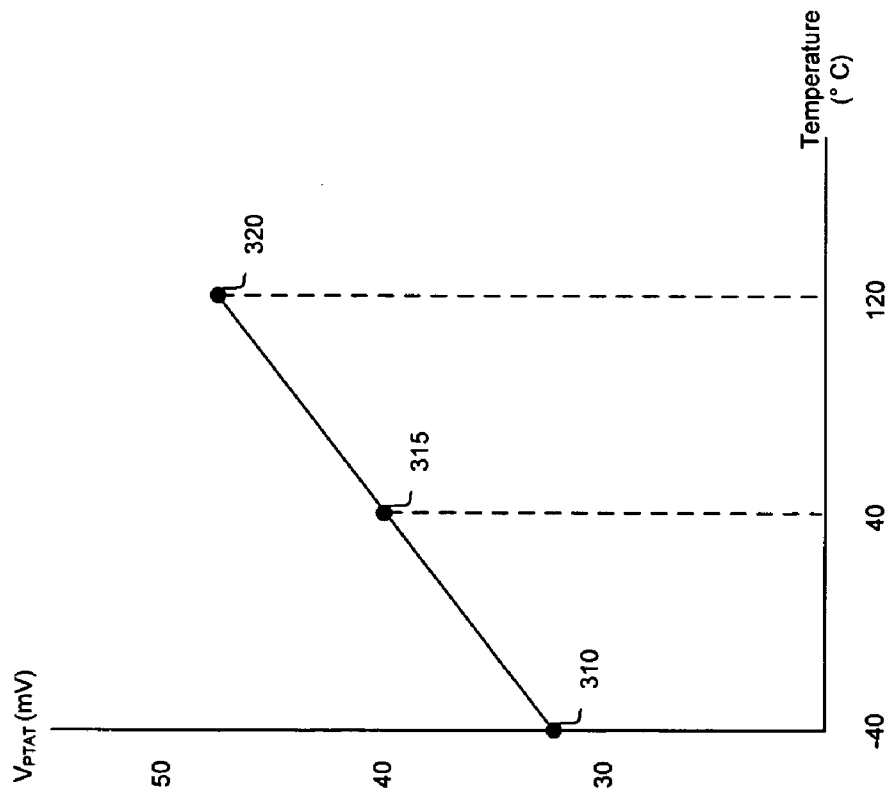
FIG. 3a is an exemplary graph of proportional to absolute temperature voltage ($V_{PTAT}$) versus temperature, in accordance with an embodiment of the invention.

FIG. 3a is an exemplary graph of proportional to absolute temperature voltage ($V_{PTAT}$) versus temperature, in accordance with an embodiment of the invention. Referring to FIG. 3a, there is shown proportional to absolute temperature (PTAT) voltages $V_{PTAT}$ 310, 315 and 320 versus temperature. $V_{PTAT}$ 310 may be 28.8 mV at −40° C., $V_{PTAT}$ 315 may be 38 mV at 40° C., and $V_{PTAT}$ 320 may be 47 mV at 120° C., and the slope of $V_{PTAT}$ with respect to temperature may be 0.12 mV/degree. This slope may be determined by the expression $(K/q)*\ln(4)$. As described in FIG. 2, K is Boltzmann's constant, $1.38 \times 10^{-23}$ Joules/Kelvin, q is the charge of an electron, $1.6 \times 10^{-19}$ Coulombs, and the constant 4 is the ratio of the PNP junction transistor sizes, as described in FIG. 2. This graph may illustrate the variance of voltage across a resistor with respect to temperature.

FIG. 3b is an exemplary graph of base-emitter voltage ($V_{BE}$) versus temperature, in accordance with an embodiment of the invention. Referring to FIG. 3b, there is shown measured junction transistor base-emitter voltages $V_{be1}$ 330, 335 and 340 versus temperature. $V_{be1}$ 330 may be 854 mV at −40° C., $V_{be1}$ 335 may be 730 mV at 40° C., and $V_{be1}$ 330 may be 600 mV at 120° C. The slope of $V_{be1}$ with respect to temperature may be −1.5 mV/degree. This may illustrate the variance of the base-emitter voltage of a junction transistor, and the base-emitter voltage may affect current flowing through a junction transistor.

Figure 4:
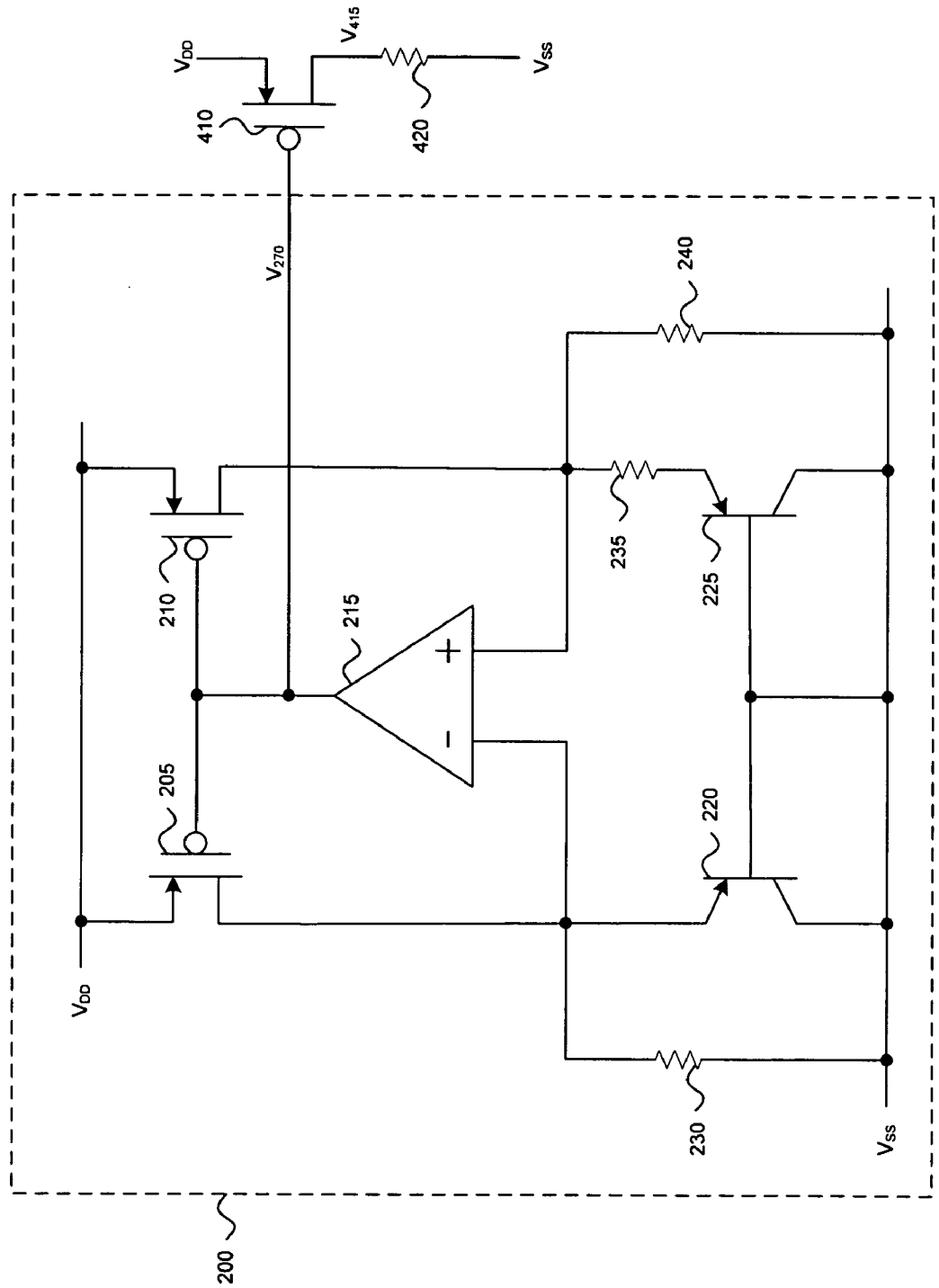
FIG. 4 is a block diagram illustrating exemplary circuit that generates a reference voltage, in accordance with an embodiment of the invention.

FIG. 4 is a block diagram illustrating exemplary circuit that generates a reference voltage, in accordance with an embodiment of the invention. Referring to FIG. 4, there is shown a current source controller 200, a PMOS transistor 410, and a resistor 420. The current source controller 200 may be substantially similar to the current source controller 200 described in FIG. 2. The current source controller 200 may communicate a control voltage $V_{270}$ to a gate of the PMOS transistor 410. The source of the PMOS transistor 410 may be coupled to a higher voltage potential ($V_{DD}$) of a voltage supply, and the drain of the PMOS transistor 410 may be coupled to a first terminal of the resistor 420. The second terminal of the resistor 420 may be coupled to a lower voltage potential ($V_{SS}$) of the voltage supply.

In operation, the current source controller 200 may generate the control voltage $V_{270}$, as described in FIG. 2. The control voltage $V_{270}$ may be communicated to the gate of the PMOS transistor 410. The PMOS transistor 410 may then generate a current, which may or may not vary with temperature depending on the resistor values $R_{230}$ and $R_{235}$, as described in FIG. 2. The generated current may then generate a reference voltage $V_{415}$ across the resistor 420, and this reference voltage $V_{415}$ may or may not vary with temperature. The reference voltage $V_{415}$ may be communicated to other devices, for example, an analog-to-digital converter, which may convert the analog reference voltage $V_{415}$ to a digital value.

Figure 5B:
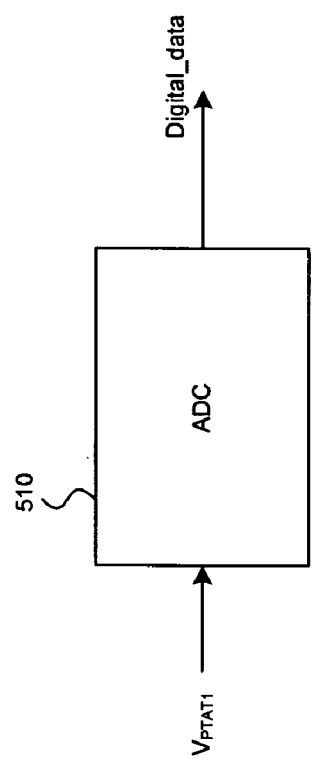
FIG. 5b is an exemplary block diagram that illustrates conversion of proportional to absolute temperature voltage ($V_{PTAT1}$) to a digital value, in accordance with an embodiment of the invention.
Figure 5A:
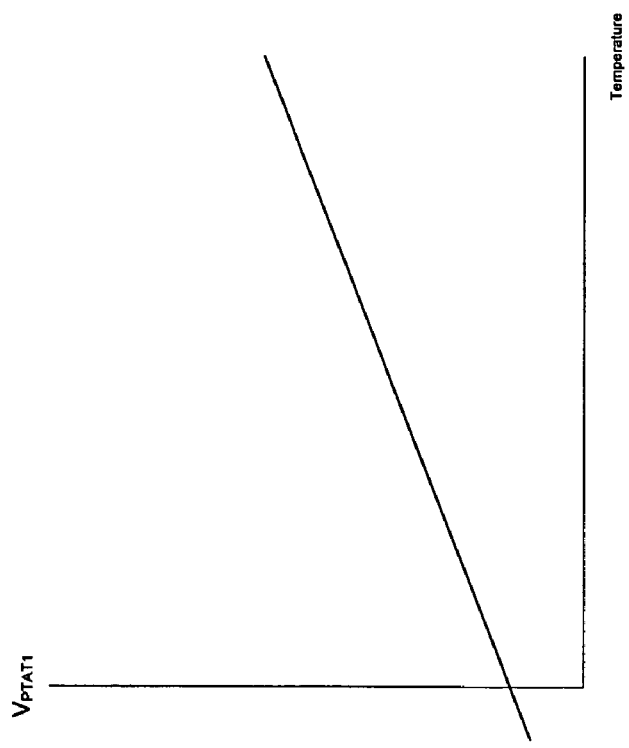
FIG. 5a is an exemplary graph of proportional to absolute temperature voltage ($V_{PTAT1}$) versus temperature, in accordance with an embodiment of the invention.

FIG. 5a is an exemplary graph of proportional to absolute temperature voltage ($V_{PTAT1}$) versus temperature, in accordance with an embodiment of the invention. Referring to FIG. 5a, there is shown a graph of $V_{PTAT1}$, which may be the reference voltage $V_{415}$ (FIG. 4) that may vary with temperature. The reference voltage $V_{415}$ may depend on the current generated by the PMOS transistor 410 (FIG. 4), and the current generated by the PMOS transistor 410 may depend on the control voltage $V_{270}$ (FIG. 4). As described in FIG. 2, the slope of the change in the control voltage $V_{270}$ with temperature may be determined by a ratio of the resistor values $R_{230}$ and $R_{235}$ (FIG. 2).

More specifically, the $V_{PTAT}$ variation with temperature may be determined, as illustrated by the graph in FIG. 3a, and the $V_{be1}$ variation with temperature may be determined, as illustrated in FIG. 3b. The $V_{PTAT}$ variation may be compared to $V_{be1}$ variation, and the two voltages $V_{be1}$ and $V_{PTAT}$ may have a ratio of $$V_{be1}/V_{PTAT} = (-1.5 \text{ mV/degree})/(0.12 \text{ mV/degree}) = -12.5,$$

where the $V_{be1}$ changes 12.5 times as much as $V_{PTAT}$ per unit temperature. Therefore, the necessary resistor values may be chosen in order to generate a substantially constant current independent of temperature, or a current that may vary proportionally with respect to temperature. In FIG. 2, an equation showed that the currents $I_{205}$ and $I_{210}$ of the PMOS transistors 205 and 210, respectively, may be described by:

$$(1/R_{230})(V_{be1}+(V_{PTAT}*(R_{230}/R_{235}))).$$

Therefore, choosing correct values of $R_{230}$ and $R_{235}$ may result in the desired current characteristic, where the desired current characteristic may be a current that is substantially constant with temperature, or a current that varies with temperature in a linear manner.

Since it was determined that the $V_{be1}$ changed 12.5 times as much as $V_{PTAT}$ per unit temperature, if the value of $R_{230}$ is 12.5 times larger than the value of $R_{235}$, the temperature effects on $V_{be1}$ and $V_{PTAT}$ will cancel and the resulting current will be a substantially constant. If the value of $R_{230}$ is not 12.5 times larger than the value of $R_{235}$, then the current may change with temperature. The current through the resistor 230 (FIG. 2) may then be calculated as $$(1/R_{230})(V_{be1}+(V_{PTAT}*(R_{230}/R_{235})))$$

In this regard, varying the resistor ratio of $R_{230}/R_{235}$ changes the slope of $V_{PTAT1}$ with respect to temperature. This, in effect, may change the dynamic range of the $V_{PTAT1}$ with respect to temperature.

FIG. 5b is an exemplary block diagram that illustrates conversion of proportional to absolute temperature voltage ($V_{PTAT1}$) to a digital value, in accordance with an embodiment of the invention. Referring to FIG. 5b, there is shown an input voltage ($V_{PTAT1}$) that may vary proportionally with temperature, an analog-to-digital converter 510, and digital data that may be an output of the analog-to-digital converter. An analog-to-digital converter may comprise logic, circuitry, and/or code that may be adapted to convert an analog input signal to a digital output signal, in which the digital output signal may be a plurality of bits, and the rate of conversion of the analog input to digital output, or the sample rate, may be pre-determined or under external control, for example, under programmed control by a controller. The controller may be part of the RF transmitter system 150 (FIG. 1b), for example, the processor 156 (FIG. 1b), or external to the RF transmitter system 150.

In operation, the $V_{PTAT1}$ may be communicated to the analog-to-digital converter 510, and the $V_{PTAT1}$ may be, for example, the reference voltage $V_{415}$ (FIG. 4). The analog-to-digital converter 510 may convert the analog input voltage $V_{PTAT1}$ to a digital output signal Digital_data. The digital output signal Digital_data may be communicated to, for example, a lookup table. The output of the lookup table may be a temperature that may correspond to the digital output signal Digital_data.

Figure 6:
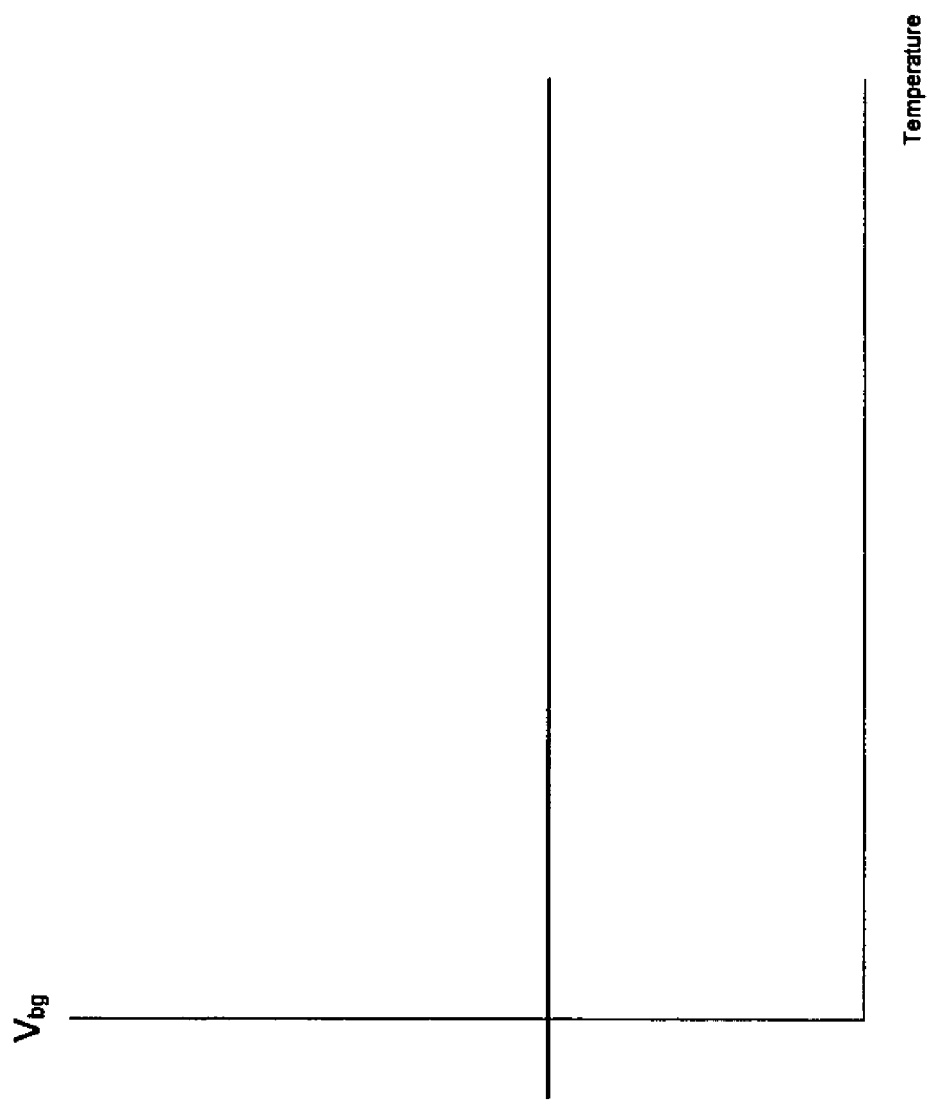
FIG. 6 is an exemplary graph of constant with temperature bandgap voltage ($V_{bg}$) versus temperature, in accordance with an embodiment of the invention.

FIG. 6 is an exemplary graph of constant with temperature bandgap voltage ($V_{bg}$) versus temperature, in accordance with an embodiment of the invention. Referring to FIG. 6, there is shown a graph of $V_{bg}$, which may be the reference voltage $V_{415}$ (FIG. 4) that may be substantially constant regardless of temperature. The reference voltage $V_{415}$ may depend on the current generated by the PMOS transistor 410 (FIG. 4), and the current generated by the PMOS transistor 410 may depend on the control voltage $V_{270}$ (FIG. 4). As described with respect to FIG. 2 and FIG. 5a, the slope of the change in the control voltage $V_{270}$ with temperature may be determined by a ratio of the resistor values $R_{230}$ and $R_{235}$ (FIG. 2). The $V_{bg}$ may be used to remove some of the DC offset of the $V_{PTAT1}$ described in FIG. 5a. This will be illustrated in FIG. 7.

Figure 7:
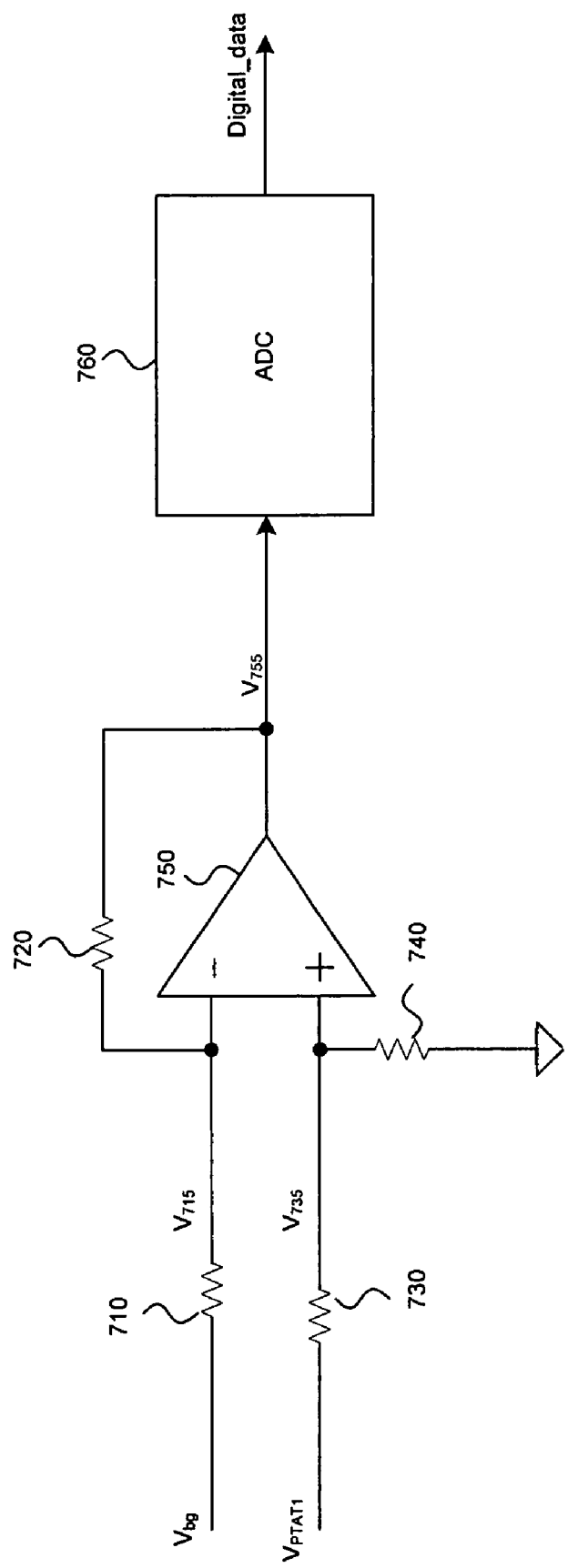
FIG. 7 is an exemplary block diagram that illustrates conversion of $V_{PTAT1}$ and $V_{bg}$ to a digital value, in accordance with an embodiment of the invention.

FIG. 7 is an exemplary block diagram that illustrates conversion of $V_{PTAT1}$ and $V_{bg}$ to a digital value, in accordance with an embodiment of the invention. Referring to FIG. 7, there is shown resistors 710, 720, 730 and 740, an operational amplifier (op amp) 750, and an analog-to-digital controller 760. There is also shown input voltages $V_{bg}$ and $V_{PTAT1}$, a plurality of voltages $V_{715}$, $V_{735}$, and $V_{755}$, and a digital output signal Digital_data.

The input voltage $V_{bg}$ may be communicated to a first terminal of the resistor 710, and the input voltage $V_{PTAT1}$ may be communicated to a first terminal of the resistor 730. A second terminal of the resistor 710 may be coupled to a negative input of the op amp 750 and to a first terminal of the resistor 720. A second terminal of the resistor 730 may be coupled to a first terminal of the resistor 740 and to a positive input of the op amp 750. The second terminal of the resistor 740 may be coupled to a lower voltage potential of a power supply, which may be referred to as ground. The output of the op amp 750 may be coupled to a second terminal of the resistor 720 and to an input of the analog-to-digital converter 760. The output of the analog-to-digital converter 760 may be the digital output signal Digital_data In operation, the input voltage $V_{bg}$ may be the reference voltage $V_{415}$ (FIG. 4) communicated from a first instance of a circuitry substantially similar to the circuitry shown in FIG. 4, where the input voltage $V_{bg}$ may be substantially constant with respect to temperature. The input voltage $V_{PTAT1}$ may be the reference voltage $V_{415}$ communicated from a second instance of the circuitry substantially similar to the circuitry shown in FIG. 4, where the input voltage $V_{PTAT1}$ may vary with respect to temperature. If the resistances of the resistors 710, 720, 730 and 740 are the same, for example, $R_{const}$, then the voltage $V_{735}$ at the positive input of the op amp 750 may be $$V_{PTAT1}(R_{const}/(R_{const}+R_{const}))=0.5*V_{PTAT1},$$

since the op amp 750 may have very high input impedance. At equilibrium, since the positive and negative inputs of an op amp may have the same voltages, the voltage $V_{715}$ at the negative input of the op amp 750 may also be $0.5*V_{PTAT1}$.

The current through the resistor 710 due to $V_{bg}$ may then be $$(V_{bg}-(V_{715}))/R_{const}=(V_{bg}-0.5*V_{PTAT1})/R_{const},$$

and since the inputs of the op amp 750 may be assumed to have a very high input impedance, the current through the resistor 720 may be the same as the current through the resistor 710. The voltage $V_{755}$ at the output of the op amp 750 may then be calculated as:

$$(V_{715})-(\text{current through resistor 720})*(\text{resistance of resistor 720})=0.5*V_{PTAT1}-((V_{bg}-0.5*V_{PTAT1})/R_{const})*R_{const}=V_{PTAT1}-V_{bg}.$$

Therefore, the op amp 750 configured as in FIG. 7 may subtract the substantially constant voltage $V_{bg}$ from the temperature dependent voltage $V_{PTAT1}$. The effect may be to adjust the range of $V_{PTAT1}$ so as fit the input range of the analog-to-digital converter 760. The analog-to-digital converter 760 may then convert the analog value of the input to a digital value, which may be the digital output signal Digital_data. The digital output signal Digital_data may be communicated to other devices, for example, a lookup table, whose output may be a temperature that may correspond to the digital output signal Digital_data.

Figure 8:
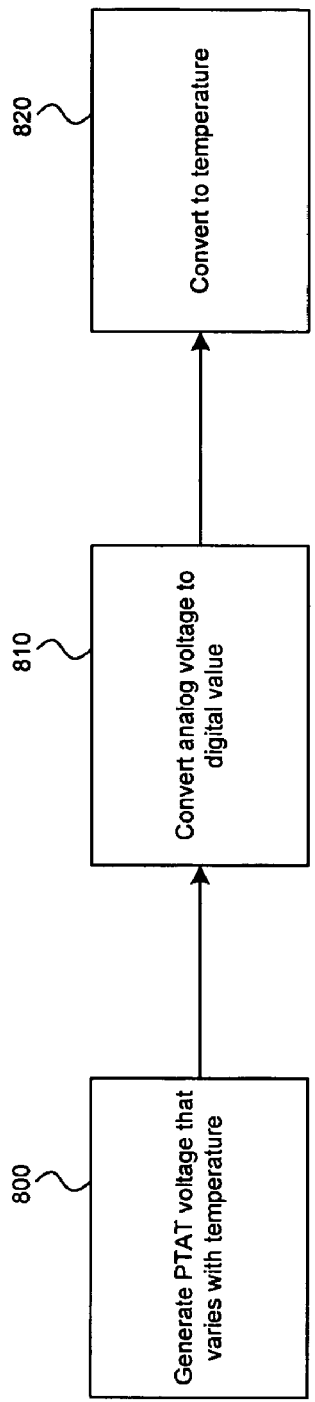
FIG. 8 is an exemplary flow diagram illustrating conversion of $V_{PTAT1}$ to temperature, in accordance with an embodiment of the invention.

FIG. 8 is an exemplary flow diagram illustrating conversion of $V_{PTAT1}$ to temperature, in accordance with an embodiment of the invention. In step 800, an analog voltage $V_{PTAT1}$ that varies proportionally to absolute temperature may be generated. In step 810, the analog voltage $V_{PTAT1}$ may be converted to a digital value. In step 820, the digital value may be converted to a temperature.

Referring to FIGS. 5a, 5b and 8, there is shown a plurality of steps 800 to 820 that may be utilized to implement a temperature sensor. In step 800, an analog voltage $V_{PTAT1}$ that varies proportionally to absolute temperature may be generated, for example, as illustrated in FIG. 5a. In step 810, the analog voltage $V_{PTAT1}$ may be converted to a digital value, for example, by communicating the analog voltage $V_{PTAT1}$ to an input of an analog-to-digital converter, as illustrated in FIG. 5b. In step 820, the digital value may be converted to a temperature, for example, by communicating the digital value to an input of a lookup table. The lookup table may utilize the digital value to output a temperature that may correspond to the digital value.

The values in the lookup table may be pre-determined, where a plurality of $V_{PTAT1}$ voltages may have been measured at various temperatures and converted to a plurality of digital values, in order to determine the correspondences between temperatures and digital values.

Figure 9:
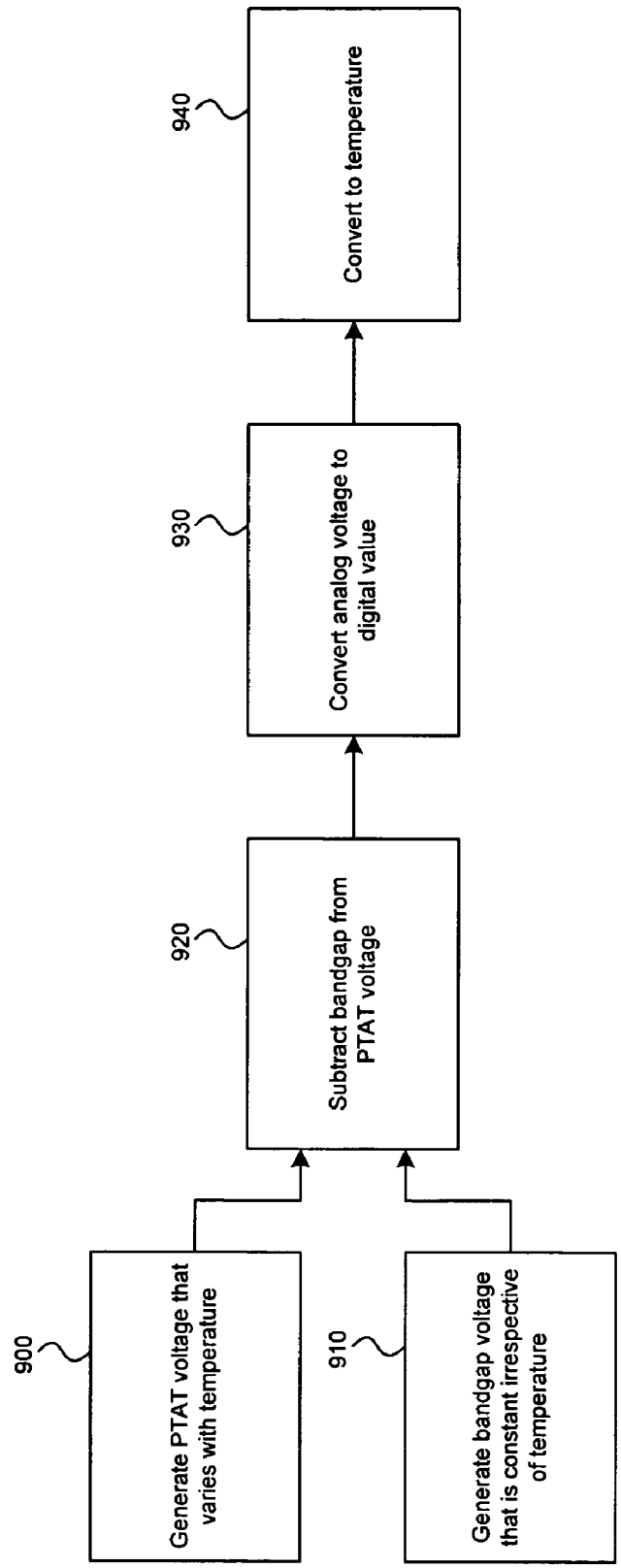
FIG. 9 is an exemplary flow diagram illustrating conversion of $V_{PTAT1}$ and $V_{bg}$ to temperature, in accordance with an embodiment of the invention.

FIG. 9 is an exemplary flow diagram of conversion of $V_{PTAT1}$ and $V_{bg}$ to temperature, in accordance with an embodiment of the invention. In step 900, an analog voltage $V_{PTAT1}$ that varies proportionally to absolute temperature may be generated. In step 910, an analog voltage $V_{bg}$ that may be substantially constant with respect to temperature may be generated. In step 920, the analog voltage $V_{bg}$ may be subtracted from the analog voltage $V_{PTAT1}$. In step 930, the resulting analog voltage from step 920 may be converted to a digital value. In step 940, the digital value may be converted to a temperature.

Referring to FIGS. 5a, 6, 7 and 9, there is shown a plurality of steps 900 to 940 that may be utilized to implement a temperature sensor. In step 900, an analog voltage $V_{PTAT1}$ that varies proportionally to absolute temperature may be generated, for example, as illustrated in FIG. 5a. In step 910, an analog voltage $V_{bg}$ that may be substantially constant with respect to temperature may be generated, for example, as illustrated in FIG. 6. In step 920, the analog voltage $V_{bg}$ may be subtracted from the analog voltage $V_{PTAT1}$, for example, by utilizing the op amp 750 as illustrated in FIG. 7. In step 930, the resulting analog voltage from step 920 may be converted to a digital value, for example, by communicating the analog voltage from step 920 to an input of an analog-to-digital converter, as illustrated in FIG. 7. In step 940, the digital value may be converted to a temperature, for example, by communicating the digital value to an input of a lookup table. The lookup table may utilize the digital value to output a temperature that may correspond to the digital value.

The values in the lookup table may be pre-determined, where a plurality of $V_{PTAT1}$ voltages may have been measured at various temperatures and converted to a plurality of digital values, in order to determine the correspondences between temperatures and digital values.

Although specific devices may have been utilized in the various figures, the invention need not be so limited. An example may be the PNP transistors 220 and 225 in FIGS. 2 and 4. The PNP transistors 220 and 225 may be replaced by NPN transistors configured as diodes by coupling a collector to a base of the same NPN transistor.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for determining temperature, the method comprising:

generating by a first circuit within a chip a reference voltage that is proportional to temperature based on sensing said temperature from within said chip, and independently generating by a second circuit within said chip a reference voltage that is substantially constant with respect to temperature, wherein said first on-chip circuit and said second on-chip circuit comprise substantially similar configurations, and said reference voltages output by said first on-chip circuit and said second on-chip circuit are controlled by resistance values for corresponding resistive loads;

generating within said chip an output voltage that is proportional to temperature utilizing said generated reference voltage that is proportional to temperature and said generated reference voltage that is substantially constant with respect to temperature; and converting within said chip said generated output voltage to a digital value.

2. The method according to claim 1, comprising generating with each of said first on-chip circuit and said second on-chip circuit, a corresponding one of said reference voltages utilizing at least one current source to generate a voltage across a resistive load.

3. The method according to claim 1, comprising generating with each of said first on-chip circuit and said second on-chip circuit, a corresponding one of said reference voltages by feeding back a control voltage generated from an operational amplifier to control at least one current source.

4. The method according to claim 3, comprising generating with each of said first on-chip circuit and said second on-chip circuit, at least one input reference voltage for said operational amplifier utilizing PN junction characteristics of at least one bipolar junction transistor.

5. The method according to claim 4, comprising adjusting resistance of at least one resistive load within each of said first on-chip circuit and said second on-chip circuit, which is coupled to said bipolar junction transistor and to said operational amplifier, to determine a current level from said current source at a plurality of different temperatures.

6. The method according to claim 5, wherein said determined current level is substantially constant over said plurality of different temperatures.

7. The method according to claim 6, comprising generating with said second on-chip circuit said reference voltage that is substantially constant with respect to temperature by utilizing said current source to generate a substantially constant voltage across a resistive load.

8. The method according to claim 5, wherein said determined current level varies with said plurality of different temperatures.

9. The method according to claim 8, comprising generating with said first on-chip circuit said reference voltage that is proportional to temperature utilizing said current source to generate a voltage across a resistive load.

10. The method according to claim 1, comprising generating within said chips said output voltage utilizing at least one operational amplifier.

11. The method according to claim 10, comprising feeding back within said chip, an output of said at least one operational amplifier to an input of corresponding said at least one operational amplifier.

12. The method according to claim 1, wherein said output voltage is a difference of said reference voltage that varies proportionally with temperature and said reference voltage that is substantially constant with respect to temperature.

13. The method according to claim 1, comprising determining variation of said output voltage with temperature.

14. The method according to claim 13, comprising generating a lookup table based on said determination of said output voltage variation, wherein said lookup table comprises a plurality of temperatures, each of which is mapped to a particular one of a plurality of corresponding said digital values.

15. A system for determining temperature, the system comprising:
a first circuit within a chip that generates a reference voltage that is proportional to temperature based on sensing temperature from within said chip, and a second circuit within said chip that independently generates a reference voltage that is substantially constant with respect to temperature, wherein said first on-chip circuit and said second on-chip circuit comprise substantially similar configurations, and said reference voltages output by said first on-chip circuit and said second on-chip circuit are controlled by resistance values for corresponding resistive loads;
circuitry within said chip that generates an output voltage that is proportional to temperature utilizing said generated reference voltage that is proportional to temperature and said generated reference voltage that is substantially constant with respect to temperature; and
an analog-to-digital converter within said chip that converts said generated output voltage to a digital value.

16. The system according to claim 15, comprising at least one current source within each of said first on-chip circuit and said second on-chip circuit, to generate a voltage across a resistive load to generate a corresponding one of said reference voltages.

17. The system according to claim 15, comprising an operational amplifier within each of said first on-chip circuit and said second on-chip circuit, that generates a control voltage that is fed back to control at least one current source, wherein said control voltage is used to generate a corresponding one of said reference voltages.

18. The system according to claim 17, comprising at least one bipolar junction transistor within each of said first on-chip circuit and said second on-chip circuit whose PN junction characteristics are utilized to generate at least one input reference voltage for said operational amplifier.

19. The system according to claim 18, comprising at least one resistive load within each of said first on-chip circuit and said second on-chip circuit, whose resistance is adjusted, which is coupled to said bipolar junction transistor and to said operational amplifier, to determine a current level from said current source at a plurality of different temperatures.

20. The system according to claim 19, wherein said determined current level is substantially constant over said plurality of different temperatures.

21. The system according to claim 20, comprising a resistive load within said second on-chip circuit, wherein said current source generates a substantially constant voltage across said resistive load to generate said reference voltage that is substantially constant with respect to temperature.

22. The system according to claim 19, comprising a resistive load within said first on-chip circuit, wherein said current source generates a voltage across said resistive load to generate said reference voltage that is proportional to temperature.

23. The system according to claim 19, wherein said determined current level varies with said plurality of different temperatures.

24. The system according to claim 15, comprising at least one operational amplifier within said chip that generates said output voltage.

25. The system according to claim 24, comprising a feedback path within said chip from an output of said at least one operational amplifier to an input of corresponding said at least one operational amplifier.

26. The system according to claim 15, wherein said output voltage is a difference of said reference voltage that varies proportionally with temperature and at least one of said reference voltages that is substantially constant with respect to temperature.

27. The system according to claim 15, wherein variation of said output voltage with temperature is determined.

28. The system according to claim 27, comprising a lookup table based on said determination of said output voltage variation, wherein said lookup table comprises a plurality of temperatures, each of which is mapped to a particular one of a plurality of corresponding said digital values.

29. A method for determining temperature, the method comprising: generating in a chip a reference voltage that is proportional to temperature sensed within said chip by selecting appropriate resistance values for resistive devices in a first instance of a circuit, and generating a reference voltage that is substantially constant with respect to temperature by selecting appropriate resistance values for corresponding resistive devices in a second instance of said circuit;

generating an output voltage by subtracting said reference voltage that is substantially constant with respect to temperature from said reference voltage that is proportional to temperature; and converting said generated output voltage to a digital value.

30. The method according to claim 29, comprising generating said reference voltage by feeding back a control voltage generated from an operational amplifier to control at least one current source.

31. The method according to claim 30, comprising generating an input reference voltage for said operational amplifier utilizing PN junction characteristics of at least one bipolar junction transistor.

32. The method according to claim 31, comprising adjusting resistance values of said resistive devices, which is coupled to said bipolar junction transistor and to said operational amplifier, to determine a current level from said current source at a plurality of different temperatures.

33. The method according to claim 32, wherein said determined current level is used to generate said reference voltage output by said circuit.

34. The method according to claim 29, comprising generating said output voltage utilizing an operational amplifier.

35. The method according to claim 34, comprising feeding back an output of said operational amplifier to an input of said operational amplifier.

36. The method according to claim 29, comprising determining variation of said output voltage with temperature.

37. The method according to claim 36, comprising generating a lookup table based on said determination of said output voltage variation, wherein said lookup table comprises a plurality of temperatures, each of which is mapped to a particular one of a plurality of corresponding said digital values.

38. A system for determining temperature, the system comprising:

a circuit within a chip whose generation of a reference voltage is controlled by resistance values for a plurality of resistive devices, wherein a first instance of said circuit within said chip comprises appropriate resistance values to generate a reference voltage that is proportional to temperature sensed within said chip, and a second instance of said circuit within said chip comprises appropriate resistance values to generate a reference voltage that is substantially constant with respect to temperature;

circuitry within said chip that generates an output voltage by subtracting said reference voltage that is substantially constant with respect to temperature from said reference voltage that is proportional to temperature; and an analog-to-digital converter within said chip that converts said generated output voltage to a digital value.

39. The system according to claim 38, comprising at least one current source, which enables generation of said reference voltage, that is controlled by feeding back a control voltage generated from an operational amplifier.

40. The system according to claim 39, wherein said operational amplifier generates an input reference voltage utilizing PN junction characteristics of at least one bipolar junction transistor.

41. The system according to claim 40, wherein resistance of at least one resistive device is adjusted, wherein said at least one resistive device is coupled to said bipolar junction transistor and to said operational amplifier, to determine a current level from said current source at a plurality of different temperatures.

42. The system according to claim 41, wherein said circuit generates said reference voltage using said determined current level.

43. The system according to claim 38, wherein an operational amplifier is used to generate said output voltage.

44. The system according to claim 43, wherein an output of said operational amplifier is fed back to an input of said operational amplifier.

45. The system according to claim 38, wherein variation of said output voltage with temperature is determined.

46. The system according to claim 45, comprising a lookup table that is generated based on said determination of said output voltage variation, wherein said lookup table comprises a plurality of temperatures, each of which is mapped to a particular one of a plurality of corresponding said digital values.

* * * * *